United States Patent [19]

Baur

[11] 3,942,583
[45] Mar. 9, 1976

[54] LOST PLASTIC PATTERN FOR CASTING

[76] Inventor: Eduard Baur, Hohenzollernring 84, 5 Cologne, Germany

[22] Filed: May 27, 1970

[21] Appl. No.: 51,401

[30] Foreign Application Priority Data
May 30, 1969  Germany............................ 1927538

[52] U.S. Cl. .............................................. 164/246
[51] Int. Cl.[2].............................................. B22C 7/02
[58] Field of Search ........... 164/235, 236, 237, 238, 164/239, 242, 243, 244, 245, 246, 247, 248, 249, 34, 35, 40, 45; 18/DIG. 57, 47 R; 249/112, 113, 114, 115, 116, 117, 61, 62, 175; 52/84, 726, 309, 200

[56] References Cited
UNITED STATES PATENTS

| | | | |
|---|---|---|---|
| 1,392,496 | 10/1921 | Hain ..................... | 249/175 |
| 2,348,935 | 5/1944 | Smith..................... | 249/114 |
| 2,456,424 | 12/1948 | Neiman................... | 164/246 |
| 2,830,343 | 4/1958 | Shroyer................... | 164/34 |
| 3,169,288 | 2/1965 | Dewey ................. | 164/246 UX |
| 3,351,123 | 11/1967 | Payne ............................. | 164/235 X |
| 3,381,929 | 5/1968 | Bancker......................... | 249/189 X |
| 3,488,027 | 1/1970 | Evans.............................. | 249/134 X |

FOREIGN PATENTS OR APPLICATIONS
| | | | |
|---|---|---|---|
| 870,169 | 6/1961 | United Kingdom................ | 164/235 |

OTHER PUBLICATIONS

Molder 1 & C; Bureau of Naval Personnel; (Navpers 10585-A), 1964 p. 54.

Primary Examiner—Francis S. Husar
Assistant Examiner—John S. Brown
Attorney, Agent, or Firm—P. D. Golrick

[57] ABSTRACT

Hollow "lost plastic" patterns for metal casting molds are built up from plastic plate or sheet material bonded to internal supporting framing; the elements being formed of substantially ashless plastic solid or foam rod sheets or laminates easily sculptured or bent to desired shape when heated to provide even large and complex hollow patterns with a comparatively small expenditure of pattern material and labor.

10 Claims, 6 Drawing Figures

U.S. Patent  March 9, 1976  3,942,583
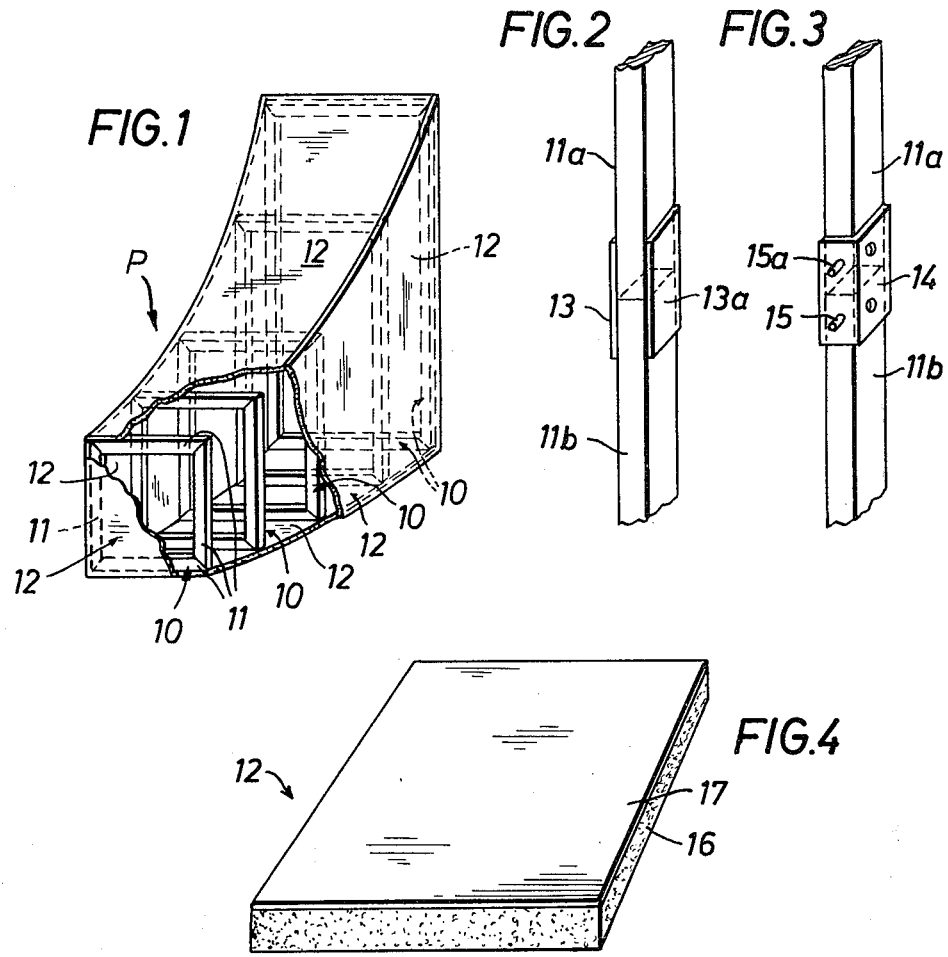
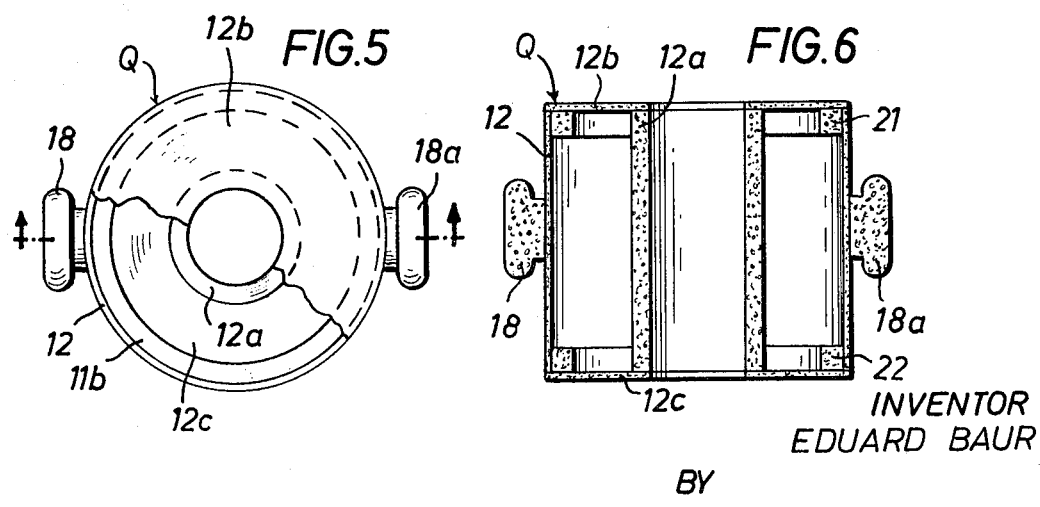
INVENTOR
EDUARD BAUR
BY

LOST PLASTIC PATTERN FOR CASTING

For castings of complicated shapes, particularly where only a few castings are to be produced, it is inconvenient and costly to make a foundry pattern from wood in the usual fashion.

It is well known in the prior art to make a solid pattern from meltable material, for example, wax or plastic shaped by plastic injection molding procedures, to make a casting mold with such a pattern, and to melt or burn the pattern out of or into the mold sand or investment material before the casting, so that the resulting mold cavity is a true likeness of the desired casting.

Further also known is the preparation and use of a solid pattern of a burnable or gasifiable plastic foam which is embedded in the mold forming material and burnt out of the mold directly through and replaced by the hot metal poured into the mold. Such solid plastic foam patterns either receive their shape from the mold in which foamed or are prepared from solid large foam blocks by machining operations or in effect by sculpturing or cutting with a heated knife or glow wire.

Making these plastic patterns in a mold is a quite costly procedure, therefore requiring a large number to be economically feasible. On the other hand, the development or derivation of the pattern contour through machining or shaping operations on plastic foam blocks is quite complicated and entails great expense.

In the case of larger patterns, the foam blocks are machined by sawing, milling or like working operations carried out with large machine tools. This requires not only a considerable expenditure of machine tool time, but also the set-up operations are quite complicated. The blocks are accordingly processed with the same precautions and set-up operations as are undertaken for the machining of conventional elements.

A further disadvantage of pattern fabrication from foam blocks is the great amount of foam material scrap entailed; and furthermore, since foam patterns prepared in this fashion are solid, even the finished pattern itself contains a large amount of the foam.

It is the general object of the invention to eliminate the aforementioned disadvantages and to provide a lost plastic pattern for metal casting molds which may be burnt out without any appreciable residue, therefore an ashless pattern, which is very simply fabricated with simple tools and at the same time requires the expenditure of only relatively small amounts of material.

For this purpose in accordance with the invention there is provided a pattern comprised of bars and plates or sheets in a hollow configuration. By a further feature of the invention the rods or plates may be comprised of foam plastic, such as foams of polyurethane, phenol resin, polystyrene, cellulose acetate, polyvinylchloride, polyethylene or vinylacetate; with the rods especially comprised of a hard foam.

The plastic plates or sheeting components can also be solid plastic, especially polyethylene, in which case especially advantageously the plates are constituted of a plurality of layers with one layer of synthetic plastic foam being covered by a layer or film of solid (i.e. non-foam) plastic.

The pattern components produced from rod or bar stock may be comprised of smaller pieces cemented or otherwise bonded to one another; but by a further modification, it is also possible that the rod or bar components be secured together with nails or pins of plastic, particularly of hard foam plastic.

In accordance with a further inventive feature the constituent elements for the pattern, whether of bar or sheet thermoplastic stock, are bent as required, particularly advantageously being given their shape preferably by heating the solid or foam plastic elements in a water bath and bending them in the heated condition to the requisite contour or shape.

Further if desired the heated and contoured elements can be held in or by a template, jig or like securing means to maintain the conferred shape until cold.

Other objects and advantages will appear from the following description and the drawings wherein:

FIG. 1 is a perspective view representing by way of example one form of a lost plastic pattern for casting molds;

FIGS. 2 and 3 are perspective detailed views showing a suitable way of securing to each other end portions of plastic bars or rods;

FIG. 4 is a perspective view of a laminated sheet or plate structure;

FIG. 5 shows another example of a lost plastic pattern, in top plan view; and

FIG. 6 is a vertical section taken along the line VI—VI in FIG. 5.

In the drawings, FIG. 1 represents by way of example one form of a "lost plastic" pattern P of hollow construction in accordance with the invention for use in making a metal casting mold. The pattern is comprised of ribbing structures or frames 10, each formed of a plurality of rods or bars 11, and the plates or sheets 12 supported by the framing in a rigid hollow structure.

For the simple rectangular frames 10, the respective side elements are simply cut from bar stock with appropriate mitering, and adhesively bonded at the corners. The frames are then positioned in properly spaced relation for application of the plates or sheet 12 which have been cut and where required bent, to conform to the frames, being thereon secured, preferably through adhesive bonding. However, the structure can be secured through nailing or pinning of the elements together, particularly advantageously with plastic pins especially of synthetic plastic foam. The frames may be held spaced by initial jigging until one or more of the side or end plates 12 are bonded thereto, or by one or more spacer stringers secured to the frames.

Obviously the hollow construction thus supplied by the invention is quite easily produced and requires only a very small consumption of material. Especially advantageously the frames can be easily shaped to establish local sections or shapes of the total model, by cutting and then pinning or gluing together, or forming while in a thermoplastic condition so that the pattern an be fabricated with simple hand tools.

The elements 11 which constitute the ribs or sides of each frame need not be constituted of smaller individual pieces, for obviously it is also possible that the open rectangular frames, as well as other shaped open frames, can be cut out of plate stock. Preferably the bars or other stock material from which the framings are made is a hard plastic foam so that they have a high rigidity. However, for framing and for the sheet material applied thereto and determining the effective pattern external contour, either foam or solid material may be used as long as it is essentially ashless, can be readily burned out of the mold, and easily shaped, especially by heating in a water bath to a plastic state.

Detailed FIG. 2 shows the manner in which two bar end portions 11a and 11b of hard foam plastic can be connected, butted endwise in alignment, through plates 13 and 13a cemented thereto as splice plates, for example in joining shorter pieces or closing a piece of bar or rod stock upon itself. FIG. 3 on the other hand shows the two bar end portions 11a and 11b connected to one another through a piece 14 of right angle plastic section embracing both bar ends with the requisite securement obtained thrugh the nails or pins of hard plastic foam 15 and 15a. However, adhesive may also be used in conjunction with the pinning.

In FIG. 4, a laminated plate or sheet 12 is comprised of a sheet plastic foam principal or base plate 16, on one face of which is bonded a thin plate or film sheet 17 of plastic material. In this case the bonding by cementing can be achieved by heating one or both plates under application of light pressure; or in similar fashion the bonding can be achieved where, in heated condition of one or both materials, they become adherent without use of a special adhesive. When such a laminated plate is used as the sheathing on framing elements in a pattern, the smooth solid (i.e., non-foam) layer 17 is disposed outwardly as the outer surface of the pattern contacted by the mold sand, so that the casting ultimately produced has a correspondingly smooth surface.

FIGS. 5 and 6 show a lost plastic pattern Q for the casting of a hollow cylinder provided with integral lugs or knobs on opposite sides. This pattern is comprised of two elements of bar stock which have been bent and shaped into the respective top and bottom foam plastic rings 21, 22, with ends of bars in each ring joined, for example as shown in FIGS. 2 or 3; an outer hollow cylindrical sheet element 12 formed by bending and shaping a foam sheet or plate; and a similarly formed, coaxially diposed, thicker walled, hollow cylindrical element 12a; and the two upper and lower centrally apertured end foam plastic plates 12b and 12c. On diametrically opposite positions on the exterior of the component 12, there are cemented the two solid foam parts 18 and 18a in the shape desired for the knobs. The end pieces 12b and 12c obviously are easily cut from plate or sheet stock, by hand tools; while appropriately sized sheets are thermoplastically bent into the hollow cylinders 12 and 12a with butted ends appropriately cemented.

Here as in FIG. 1 the rings 21, 22 provide ribbing or framing supporting the juncture of and also providing a wide area for cementing the cylindrical element 12 to the end plates 12b and 12c, the latter being also cemented endwise to the internal cylindrical element 12a.

In the making of the castings, the hollow lost plastic patterns, such as those above described, are embedded in the molding sand or like molding material in usual fashion as for investment castings, with appropriate patterning for gating or spruing provided (here not shown). Thereafter by application of heat, which for example can take place in a drying oven, the pattern, such as P or Q, is burned out or gasefied; and furthermore this is accomplished without residual material or ash by using one or more of the ennumerated thermoplastic plastic materials, whether in foam or solid (that is, non-foamed) form. Thereby the mold cavity is made for reception of the cast metal.

It is, however, also possible to burn out or gasify the lost plastic pattern P or Q by the heat of the metal itself which is poured into the mold.

I claim:

1. A lost plastic pattern for use in producing metal casting molds, comprising:
   internal framework means comprised of a plurality of peripherally continuous open frame sub-assemblies, said sub-assemblies spaced from each other; and
   external sheeting applied as sheathing means secured to and supported by said framework means and defining the mold-cavity-determining, pattern-external-surface contour, and constituting with the framework means a composite pattern hollow in the pattern section providing the cast metal filled cavity of the mold to be produced;
   said framework means and sheathing means comprised of respective synthetic plastic material gasifiable or burnable under applied heat, and substantially ashless;
   said sheeting being comprised of a plurality of laminations including an external lamination of solid plastic film applied onto and covering an underlying framing-means-supported lamination of plastic foam.

2. A pattern as described in claim 1, with the framework means comprised of plastic foam.

3. A pattern as described in claim 1 wherein the foam materials constituting said framework and sheathing means are each independently selected from the group consisting of foams of polystyrene, cellulose acetate, polyvinyl chloride, polyethylene, vinyl acetate, and phenol resin.

4. A pattern as described in claim 2, with at least one of said means comprised of phenol resin foam.

5. A pattern as described in claim 1 with the framework means constituted of hard plastic foam bar stock.

6. A pattern as described in claim 1, with the framework and sheathing means comprised of polyurethane foam material.

7. A pattern as described in claim 1 with the framework means constituted of solid polyethylene.

8. A pattern as described in claim 1 with said framework means including at least one frame unit constituted of smaller pieces of bar stock secured together.

9. A pattern as described in claim 1 with said framework means including at least one frame unit constituted of smaller pieces secured together by hard foam plastic pins.

10. A pattern as described in claim 1 with at least one component of said means bent to a desired shape.

* * * * *